Oct. 9, 1962 G. F. SCHROEDER 3,058,043
ELECTRICAL CONTROLLER FOR FUEL RATIO CONTROL SYSTEM
Filed Sept. 4, 1958 2 Sheets-Sheet 2

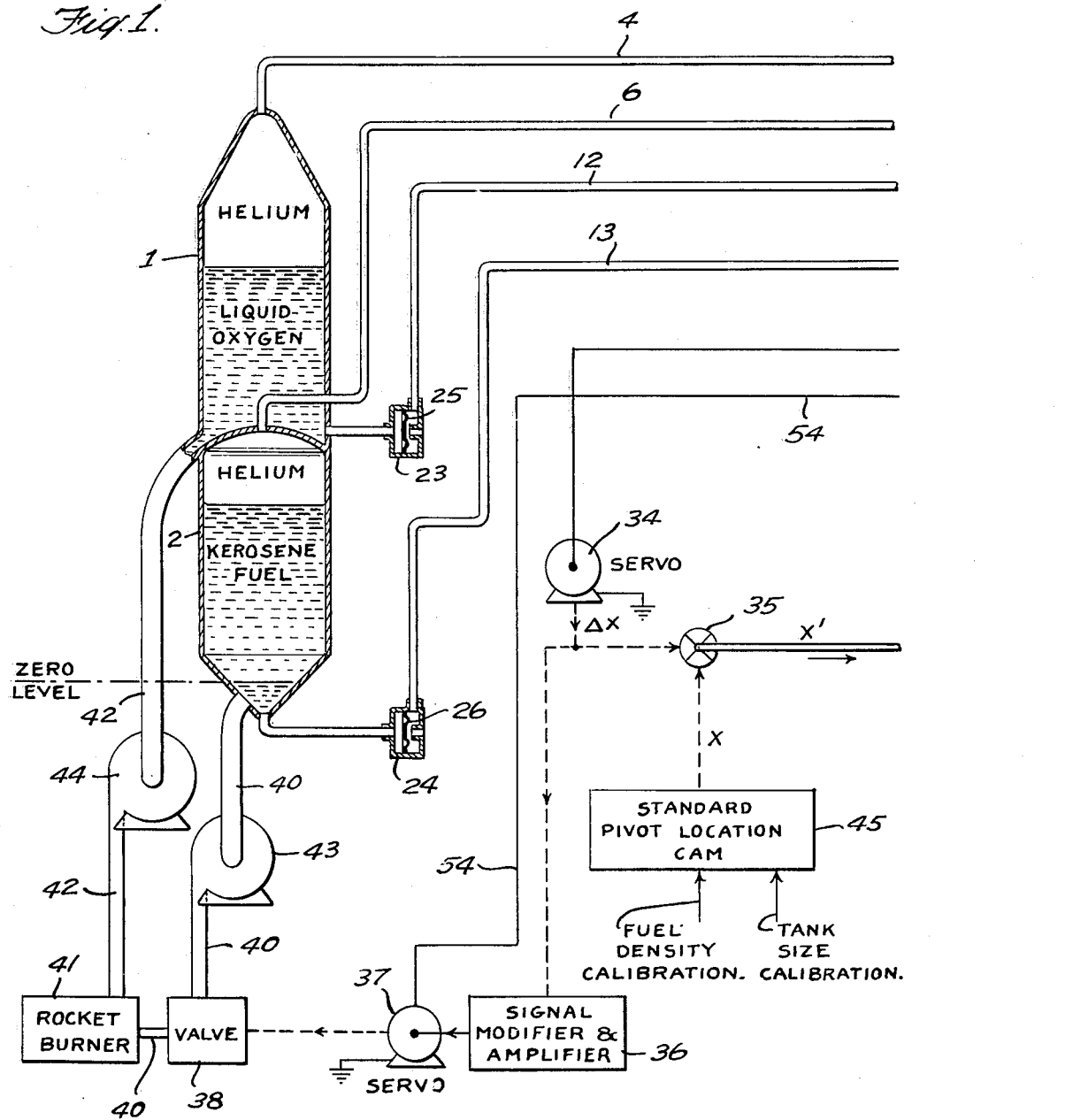

INVENTOR
GEORGE F. SCHROEDER
BY
Victor A. Borst
ATTORNEY

United States Patent Office 3,058,043
Patented Oct. 9, 1962

3,058,043
ELECTRICAL CONTROLLER FOR FUEL RATIO CONTROL SYSTEM
George F. Schroeder, Pine Lakes, Paterson, N.J., assignor to Sperry Rand Corporation, Ford Instrument Company Division, Long Island City, N.Y., a corporation of Delaware
Filed Sept. 4, 1958, Ser. No. 759,087
2 Claims. (Cl. 318—32)

This invention relates to a fuel ratio control system having a particular utility in connection with guided missiles and the like.

The novel system for fuel control contemplated by the invention has for its principal purpose to maintain automatically a predetermined ratio of missile propellants between launching and burn out so that at the end of this period there will be substantially no unused propellant aboard the craft. Hitherto, fuel ratio maintenance has been achieved by the simple initial setting of valves or by attempting to measure the individual liquid heights in the tanks and from this make suitable corrections to the fuel flow system. According to the invention the system utilizes directly the mass ratio of the tank fluids to cause the operation of a comparator which establishes a valve operating error signal when the liquids are not in the desired mass ratio. Because the mass ratio is actually a ratio of the pressures at comparable points in the tanks and the pressures are proportional to the product of liquid mass and missile acceleration which is inversely related to the mass, the dynamic range of the system is less than that of other known systems.

One object of the invention is to provide an improved fuel control system for missiles.

Another object of the invention is to provide a missile fuel control system wherein the proper fuel ratio is automatically maintained.

A further object of the invention is to provide a fuel control system for missiles which operates according to mass ratio.

Other objects and features of the invention may be appreciated from the following detailed description taken in conjunction with the accompanying drawings, in which:

FIGS. 1 and 1A are a schematic view of the propellent utilization system, and

Figure 1A:
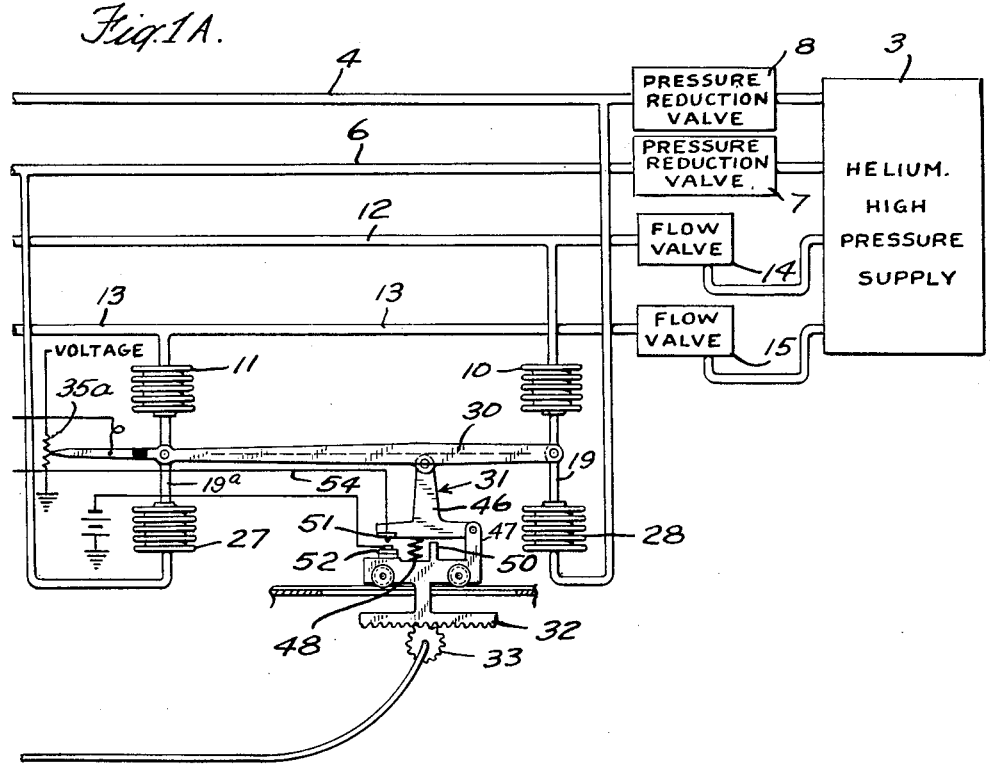

As shown in FIG. 1 the missile system utilizes a liquid oxygen tank 1 and a fuel tank 2 which are supplied helium for tank pressurization purposes by a high pressure helium supply 3. Pipe line 4 in which there is provided a pressure reduction valve 8 connects the supply to the top of tank 1 while pipe line 6 having a pressure reduction valve 7 connects the supply to the top of tank 2.

The pressure at comparable points in the tanks 1 and 2 are measured by head sensing devices which comprises a pair of bellows 10 and 11, respectively, which are connected to lines 12 and 13, respectively, in which the head pressures of the tanks are repeated. The lines 12 and 13 are connected to the supply through flow values 14 and 15, respectively which maintains the supply flow constant so that any change in pressure in the lines will be due solely to changes in head pressures in the tanks.

Figure 2:
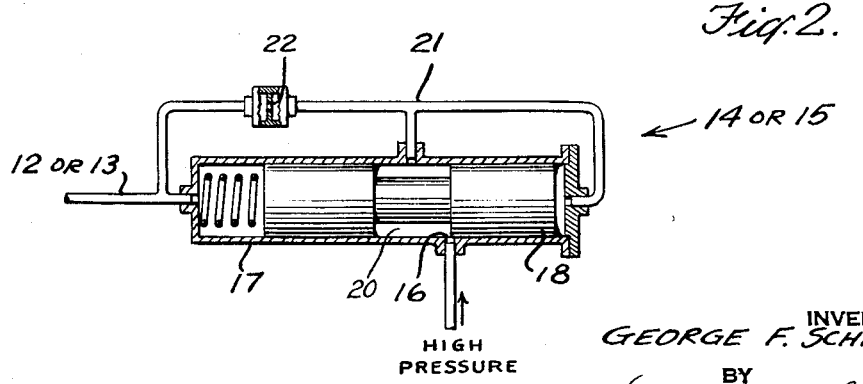
FIG. 2 is a detail in partial section of a flow valve used in the system.

As shown in FIG. 2 the helium is admitted to the valve at an opening 16 in the wall of the valve cylinder 17. A spring biased piston 18 having an intermediate groove 20 is adapted to open and close off the opening 16 according to the pressure in the escape line 21 which is connected to the ends of the cylinder and a second opening by tube passage 22. The flow of gas through an orifice 22 in the escape line is made constant by the opening and closing of the flow into the escape line according to the position of the piston. Generally, when the pressure builds up, the pressure on the head of the piston moves the piston to close off the opening to the supply and when the pressure falls off the piston is moved by the spring to open the escape line to the supply so as to allow the pressure to build up again.

The pressure in the flow lines 12 and 13 duplicate the pressures in the tanks by means of the flow valves and pressure repeaters 23 and 24. The pressure repeaters are small drums one end of which is connected to the tanks, the other end being open to atmosphere and connected to the flow lines. Flexible diaphragms 25 and 26 are provided intermediate the ends of the repeaters 23 and 24, respectively. It may be seen that as the pressure in the flow line becomes larger than the head pressures the diaphragms are moved from the opening until the pressure falls as the helium is leaked to atmosphere. When the pressure in the flow lines falls below the head pressures, the opening in the repeaters are closed by the diaphragms until the helium flow builds up the pressure in the lines until the process is repeated.

The pipe lines 6 and 4 are connected to bellows 27 and 28 which oppose bellows 11 and 10, respectively. The bottoms of the opposing bellows are connected together by linkages 19 and 19a which together control the position of a beam 30 supported by a fulcrum member 31 adjustable on a rack and pinion 32 and 33. One end of the beam 30 controls an electrical element such as a slide potentiometer 35a, which is electrically connected to servo 34. The servo 34 determines a signal error, $\Delta x$, when propellant utilization is unequal and the comparator is unbalanced and is connected through differential 35 to the pinion 33 so as to change the fulcrum position until the utilization of the propellants has been equalized.

The servo is also connected to an electrical signal modifier the output of which is amplified by amplifier 36 and is fed to motor 37 which controls the fuel rate valve 38. The valve 38 is disposed in the line 40 which connects the fuel tank 2 and rocket burner 41. Liquid oxygen is fed to the rocket burner 41 from the tank 1 by means of line 42. Fuel pumps 43 and 44 are provided in the lines 40 and 42, respectively.

The signal error $\Delta x$ serves to modify the preset position of the fulcrum member 31 which is determined by the position of cam 45 calibrated for fuel density and tank size. These known quantities establish the conditions for beam balance which will be upset only in the event there is unequal fuel utilization during the missile's flight. The output, $x$, of the cam is fed to a differential 35 on the spider shaft of which is represented the fulcrum positioning quantity $x^1$, which contains the error signal $\Delta x$, and continuously adjusts the fulcrum member to maintain beam balance. The quantity $\Delta x$ serves as an error signal for control of the fuel flow valve, which, in turn, establishes a mixture ratio for tending to equalize propellant utilization.

The fulcrum member 31 has a fail-safe mechanism comprising a beam supporting arm 46 pivotally attached at one end to a vehicle 47 to which the pinion 33 is affixed. There is affixed to the other end of the arm 46 a roller on which a track provided by the adjustable balance beam is supported. Normally the pivot 46 is subjected to a compression force $F_p$ given by the formula (1) $$F_p = F_e + F_f$$

when $F_e$ is the head pressure in tank 1 and $F_f$ is the head pressure in the tank 2. The force $F_p$ is used to position the arm 46 against a spring 48 and a mechanical stop 50 and at the same time actuate a brake (not shown) on servo 37 through electrical contacts 51 and 52 and leads 53 and 54 if force $F_e$ and/or $F_f$ were to become zero due to some failure in the pressure sensing system. If it were not for the fail-safe mechanism which causes the flow valve to seek a fixed position, the flow valve might wander aimlessly. The switch could also be used to cause servo 37 to seek a preferred position.

The fail-safe mechanism might also be expected to operate just before burn-out when the pivot setting becomes indeterminate due to a lack of sensitivity in the comparator. This would also occur when zero longitudinal acceleration is encountered.

To operate the system the liquid pressure in the tank 1 repeated in the helium line 12 and the liquid pressure in the tank 2 repeated in the helium line 13 serves to expand the bellows 10 and 11 respectively. The movement of the bellows is opposed by the bellows 28 and 27 which are activated by the helium supply lines 4 and 6, respectively. The ratio of liquid pressure to gas pressure in each tank is thus established by a pair of opposing bellows and the two pairs of ratio establishing bellows cause the beam 30 to pivot on the translatable fulcrum member 31 and assuming a departure from the desired liquid-gas ratios in the tanks, establish an error signal on its potentiometer. The servo 34 is thus caused to operate and actuate the valve 38 which is in control of the output line of the kerosene fuel tank 2. In addition, the servo output causes the fulcrum member 31 which is pivotally supported on the movable carriage 47 to be adjusted so as to restore beam balance. The fail-safe mechanism which is also in control of the valve 38 through the servo 37 causes the former to shut down in the event the pressure in the bellows 10 and/or 11 are altered sufficiently to overcome the force of the spring 48 and allow the contacts 51 and 52 to engage. The consequent enabling of the mechanism causes the brake (not shown) on servo 37 to be actuated.

It must be understood that the described system assumes that the tanks 1 and 2 have the same geometry and the pressure sensing points in each tank are located at corresponding points. These ideal conditions predicate a linearly proportionate relation between liquid mass and head pressure. When the conditions do not exist it may be necessary to move the fulcrum member as an appropriate function of time or a course measurement of liquid level obtained, for example, as some non-linear function, depending on the tank geometry, of the static head in the tank which is roughly the same as the dynamic head directed by acceleration.

Other modifications may be effected by persons skilled in the art without departing from the scope of invention and defined in the appended claims.

What is claimed is:

1. In a fuel ratio control system employing a comparator having a fulcrum, a pressure responsive lever pivotally mounted on said fulcrum, said fulcrum being translatable relative to said lever, a servo motor, means for controlling said motor according to the pivoted position of said lever, a pinion connected to said motor for translating said fulcrum, a differential interposed in the connecting means between said motor and said pinion and a pivot locating cam calibrated for fuel density and tank size connected to said differential.

2. In a fuel ratio control system as defined in claim 1, a valve controlling second servo motor, a fail-safe mechanism incorporated in said comparator and operative to stop the operation of said second servo motor under certain predetermined conditions.

References Cited in the file of this patent
UNITED STATES PATENTS

| | | |
|---|---|---|
| 2,509,629 | De Giers | May 30, 1950 |
| 2,687,168 | Haviland | Aug. 24, 1950 |
| 2,820,435 | Coar | Jan. 21, 1958 |
| 2,833,970 | Cummings | May 6, 1958 |
| 2,840,097 | Farkas | June 24, 1958 |
| 2,847,625 | Popowsky | Aug. 12, 1958 |
| 2,851,048 | Hutchinson | Sept. 9, 1958 |
| 2,860,651 | Davies | Nov. 18, 1958 |
| 2,860,653 | Taylor | Nov. 18, 1958 |